(12) United States Patent
An et al.

(10) Patent No.: US 10,078,242 B2
(45) Date of Patent: Sep. 18, 2018

(54) DISPLAY PANEL AND METHOD OF MANUFACTURING A POLARIZER

(71) Applicant: Samsung Display Co., Ltd., Yongin (KR)

(72) Inventors: Moon-Jung An, Hwaseong-si (KR); Jung-Gun Nam, Suwon-si (KR); Gug-Rae Jo, Asan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 418 days.

(21) Appl. No.: 14/824,335

(22) Filed: Aug. 12, 2015

(65) Prior Publication Data

US 2016/0131942 A1 May 12, 2016

(30) Foreign Application Priority Data

Nov. 11, 2014 (KR) .......................... 10-2014-0156396

(51) Int. Cl.
*G02F 1/1335* (2006.01)

(52) U.S. Cl.
CPC ............... *G02F 1/133528* (2013.01); *G02F 2001/133548* (2013.01); *G02F 2202/36* (2013.01)

(58) Field of Classification Search
CPC ......... G02F 1/133528; G02F 1/133536; G02F 2001/133548; G02F 2202/36
USPC .......................................................... 349/96
See application file for complete search history.

(56) References Cited

U.S. PATENT DOCUMENTS

| 6,288,840 B1 | 9/2001 | Perkins et al. |
| 8,014,068 B2 | 9/2011 | Cheong et al. |
| 2008/0100779 A1* | 5/2008 | Choo ................ G02B 5/3058 349/96 |
| 2008/0252825 A1 | 10/2008 | Kim et al. |
| 2011/0096255 A1 | 4/2011 | Rho et al. |
| 2015/0002791 A1 | 1/2015 | Nam et al. |
| 2015/0070762 A1 | 3/2015 | An et al. |
| 2015/0227230 A1* | 8/2015 | Cok .................... G06F 3/044 345/174 |

FOREIGN PATENT DOCUMENTS

| KR | 10-2008-0046017 | 5/2008 |
| KR | 10-2008-0092784 | 10/2008 |
| KR | 10-2011-0046130 | 5/2011 |
| KR | 10-2016-0049162 | 5/2016 |

* cited by examiner

*Primary Examiner* — Nathanael R Briggs
*Assistant Examiner* — William Peterson
(74) *Attorney, Agent, or Firm* — H.C. Park & Associates, PLC

(57) ABSTRACT

A display panel includes a first substrate, a second substrate disposed opposite to the first substrate and a liquid crystal layer disposed between the first substrate and the second substrate. The first substrate includes a first wire grid pattern disposed on the first substrate extending in a first direction. The first wire grid pattern includes first recesses spaced apart from each other. The first substrate includes first metal wires disposed in the recesses.

18 Claims, 12 Drawing Sheets

PL2

DISPLAY PANEL AND METHOD OF MANUFACTURING A POLARIZER

CROSS REFERENCE TO RELATED APPLICATION

This application claims priority from and the benefit of Korean Patent Application No. 10-2014-0156396, filed on Nov. 11, 2014, which is hereby incorporated by reference for all purposes as if fully set forth herein.

BACKGROUND

Field

Exemplary embodiments of the present invention relate to a display panel and a method of manufacturing a polarizer, and more particularly to a display panel including a polarizer and a method of manufacturing the polarizer.

Discussion of the Background

In a liquid crystal display apparatus a voltage may be applied to a liquid crystal layer to change the arrangement of the liquid crystal layer. Accordingly, optical properties such as a birefringence, an optical rotation, a dichroism, a light scattering, or the like, may be changed in response to the applied voltage to display an image.

The liquid crystal display apparatus generally includes a polarizer to control light transmittance. The polarizer may transmit light parallel to a transmitting axis, and may block a light perpendicular to the transmitting axis. However, the polarizer may absorb some of light from a light source, and thus, light efficiency of the liquid crystal display apparatus may be decreased.

When a flexible display including a polarizer including a wire grid pattern is strained by external power, a crack may be caused in the wire grid pattern of the polarizer. When this happens, quality of the flexible display may be decreased.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a polarizer capable of improving light efficiency.

Additional features of the invention will be set forth in the description which follows, and in part will be apparent from the description, or may be learned by practice of the invention.

Exemplary embodiments provide a display panel including the polarizer.

Exemplary embodiments provide a method of manufacturing the polarizer.

An exemplary embodiment of the present invention discloses a display panel including a first substrate, a second substrate disposed opposite to the first substrate and a liquid crystal layer disposed between the first substrate and the second substrate. The first substrate includes a first wire grid pattern disposed on the first substrate extending in a first direction. The first wire grid pattern includes a plurality of first recesses spaced apart from each other. The first substrate includes a plurality of first metal wires disposed in the first recesses.

An exemplary embodiment of the present invention also discloses a method of manufacturing a polarizer in which a polymer layer is formed on a substrate. A transferred pattern is formed by applying pressure on the polymer layer based on a mold. The transferred pattern includes a plurality of recesses extending in a first direction. An ink including a plurality of metal wires is disposed in the recesses of the transferred pattern. A metal wire pattern is formed by heating the ink.

An exemplary embodiment of the present invention also discloses a method of manufacturing a polarizer in which a metal layer is formed on a substrate. A plurality of reflection patterns is formed by patterning the metal layer. An ink including a plurality of metal wires is disposed between two adjacent reflection patterns. A metal wire pattern is formed by heating the ink.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF ILLUSTRATED EMBODIMENTS

Figure 1A:
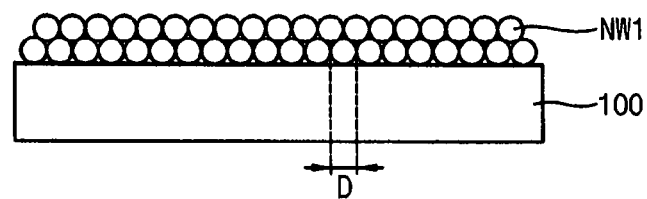
FIG. 1A is a cross-sectional view illustrating a polarizer in accordance with an exemplary embodiment of the inventive concept.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
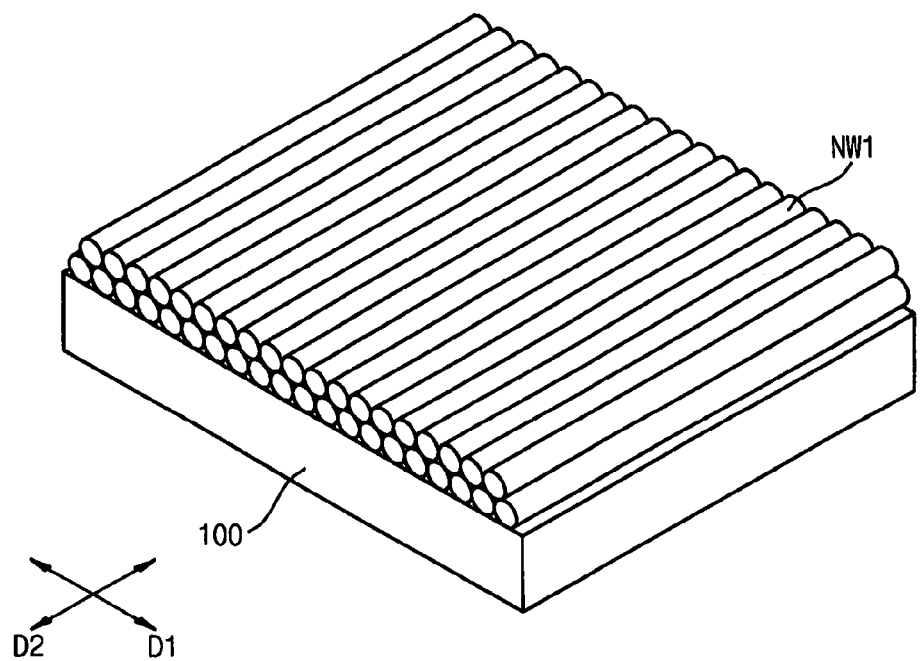
FIG. 1B is a perspective view illustrating a polarizer in accordance with an exemplary embodiment of the inventive concept.

FIG. 1A is a cross-sectional view illustrating a polarizer in accordance with an exemplary embodiment of the inventive concept. FIG. 1B is a perspective view illustrating a polarizer in accordance with an exemplary embodiment of the inventive concept.

Referring to FIGS. 1A and 1B, a polarizer PL1 includes a substrate 100 and a plurality of nano wires NW1 disposed on the substrate 100.

The substrate 100 may include a transparent material. For example, the substrate 100 may include glass, transparent plastic substrate, transparent ceramic substrate, etc. The substrate 100 may be a flexible substrate. The transparent plastic substrate/transparent ceramic substrate may include polyimide type resin, acrylic type resin, polyacrylate type resin, polycarbonate type resin, polyether type resin, polyethylene terephthalate type resin, sulfonic acid type resin, etc.

Each of the nano wires NW1 has a cylindrical shape and the nano wires are arranged in a first direction D1. The plurality of the nano wires NW1 may include multi-layered structure. A diameter D of each of the nano wires NW1 may be about 10 nm to about 50 nm. For example, the diameter D of each of the nano wires NW1 may be about 20 nm to about 30 nm.

The plurality of the nano wires NW1 may include metal. For example, the nano wires NW1 may include at least one of aluminum (Al), gold (Au), silver (Ag), copper (Cu), chrome (Cr), iron (Fe), and nickel (Ni).

Figure 2A:
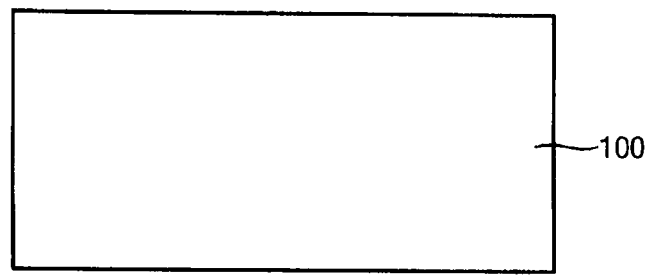
FIGS. 2A, 2B, and 2C are cross-sectional views illustrating a method of manufacturing a polarizer of FIG. 1.
Figure 2B:
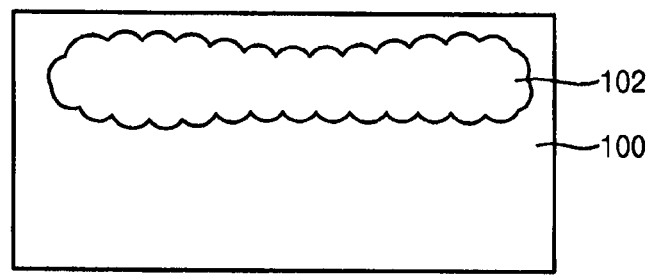
Figure 2C:
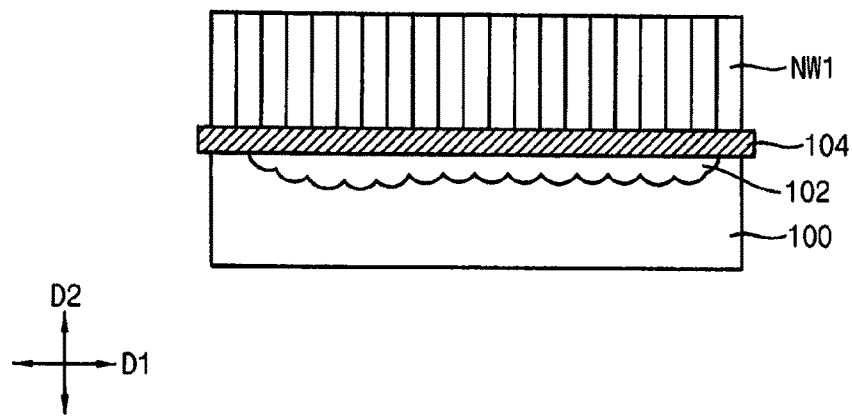
Figure 2D:
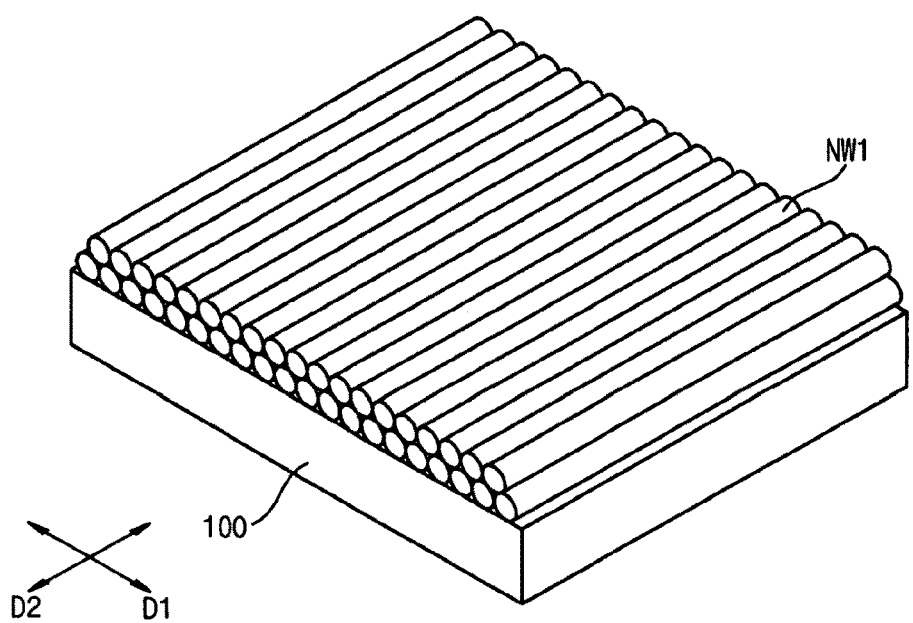
FIG. 2D is a perspective view illustrating a polarizer in accordance with an exemplary embodiment of the inventive concept.

FIGS. 2A to 2C are cross-sectional views illustrating a method of manufacturing a polarizer of FIGS. 1A and 1B. FIG. 2D is a perspective view illustrating a polarizer in accordance with an exemplary embodiment of the inventive concept.

Referring to FIG. 2A, a substrate 100 is provided. The substrate 100 may include a glass substrate, a transparent plastic substrate, a transparent ceramic substrate, etc. The substrate 100 may be a flexible substrate. The transparent plastic substrate/transparent ceramic substrate may include polyimide type resin, acrylic type resin, polyacrylate type resin, polycarbonate type resin, polyether type resin, polyethylene terephthalate type resin, sulfonic acid type resin, etc.

Referring to FIG. 2B, a metal ink 102 may be sprayed on the substrate 100, but other methods of deposition are possible. The metal ink 102 may include a metal paste including metal wires and/or metal particles which are nano size and have conductive properties. For example, the metal wires/metal particles may include at least one of aluminum (Al), gold (Au), silver (Ag), copper (Cu), chrome (Cr), iron (Fe), and nickel (Ni).

The metal ink 102 may be sprayed using, for example, a dispensing process, a screen printing process, a spin coating process, a slit coating process, a bar coating process or a nozzle spraying process.

Referring to FIG. 2C, a squeegee 104 is disposed on the metal ink 102. The squeegee 104 is moved on the substrate 100 in the second direction D2 which is substantially perpendicular to the first direction D1, and the metal ink 102 is entirely spread on the substrate 100 in the second direction D2. During this operation, the metal wires of the metal ink 102 are arranged, as shown in FIG. 2C. The squeegee 104 may include rubber materials.

The metal ink 102 disposed on the substrate 100 may be heated.

As a result, the polarizer PL1 is formed. The polarizer PL1 includes the plurality of the nano wires NW1 on the substrate 100.

Referring to FIG. 2D, the polarizer PL1 includes the substrate 100 and the plurality of the nano wires NW1 disposed on the substrate 100.

The plurality of the nano wires NW1 have a cylindrical shape and are arranged in a first direction D1. The plurality of the nano wires NW1 may include multi-layered structure. A diameter D of each of the nano wires NW1 may be about 10 nm to about 50 nm. For example, the diameter D of each of the nano wires NW1 may be about 20 nm to about 30 nm.

The plurality of the nano wires NW1 may include metal. For example, the nano wires NW1 may include at least one of aluminum (Al), gold (Au), silver (Ag), copper (Cu), chrome (Cr), iron (Fe), and nickel (Ni).

FIGS. 3A to 3G are cross-sectional views for describing a method of manufacturing a polarizer in accordance with an exemplary embodiment of the inventive concept.

Figure 3A:
FIGS. 3A, 3B, 3C, 3D, 3E, 3F, and 3G are cross-sectional views illustrating a method of manufacturing a polarizer in accordance with an exemplary embodiment of the inventive concept.

Referring to FIG. 3A, a substrate 200 is provided. The substrate 200 may include a glass substrate, a transparent plastic substrate, a transparent ceramic substrate, etc. For example, the substrate 200 may be a flexible substrate. The transparent plastic substrate/transparent ceramic substrate may include polyimide type resin, acrylic type resin, polyacrylate type resin, polycarbonate type resin, polyether type resin, polyethylene terephthalate type resin, sulfonic acid type resin, etc.

Figure 3B:
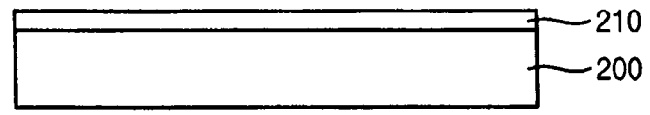

Referring to FIG. 3B, a polymer layer 210 is formed on the substrate 200. The polymer layer 210 may include thermosetting resin or photo curable resin, but is not limited thereto. The thermosetting resin may include urea resin, melamine resin, phenol resin, etc. The photo curable resin may include polymerizable compounds having a polymerizable functional group, a photo polymerization initiator initiating polymerization of the polymerizable compounds by irradiation, surfactants, antioxidants, etc.

Figure 3C:
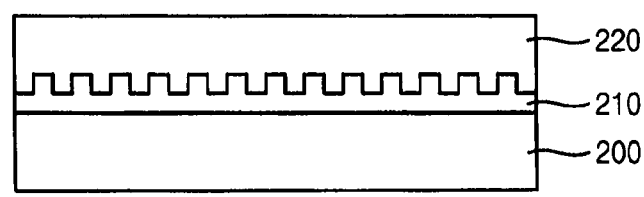
Figure 3D:
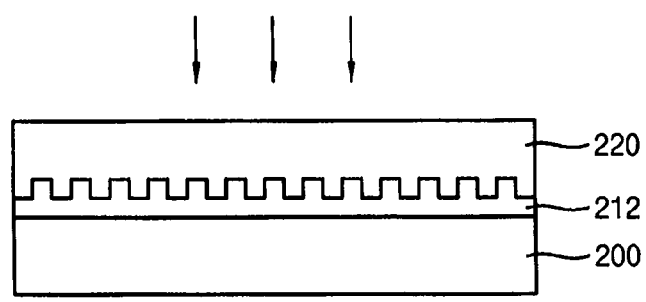

Referring to FIG. 3C, a mold 220 is disposed on polymer layer 210, and the mold 220 is pressed toward the substrate 200 as shown by the arrows in FIG. 3D, and thus a wire grid pattern is formed on the polymer layer 210. The mold 220 may have protrusions and recesses. The polymer layer 210 may have recesses facing the protrusions of the mold 220 and may protrusions facing the recesses of the mold 220.

Referring to FIG. 3D, when the polymer layer 210 includes the thermosetting resin, the mold 220 may include material having a low coefficient of thermal expansion, such as metal. When the polymer layer 210 includes the photo curable resin, the mold 220 may include a material having relatively high light-transmittance and strength, such as transparent macromolecules.

When the polymer layer 210 includes the thermosetting resin, the mold 220 is contacted with the polymer layer 210, and then the polymer layer 210 is heated to a temperature over a glass transition temperature of the thermosetting resin. The mold 220 is pressed toward the polymer layer 210, so that the pattern of the mold 220 is imprinted in the polymer layer 210. The polymer layer 210 is cooled to a temperature under the glass transition temperature, so that the patterned polymer layer 210 is hardened to form transferred pattern 212.

When the polymer layer 210 includes the photo curable resin, the mold 220 is contacted with the polymer layer 210, and then the mold 220 is pressed toward the polymer layer 210, so that the pattern of the mold 220 may be imprinted in the polymer layer 210. The mold 220 includes the material having high light-transmittance, so that the polymer layer 210 may be light irradiated. The patterned polymer layer 210 may be hardened, after the polymer layer 210 is light irradiated to form a transferred pattern 212.

Figure 3E:

Referring to FIG. 3E, the mold 220 is removed to form the transferred pattern 212 disposed on the substrate 200. The transferred pattern 212 includes protrusions and recesses. The protrusions and the recesses of the transferred pattern 212 extend in the second direction D2, which is substantially perpendicular to the first direction D1. A height of each of the recesses or a height of each of the protrusions may be about 100 nm to about 200 nm. A width of each of the recesses may be about 40 nm to about 70 nm. However, the dimensions of the recesses and protrusions may vary outside these dimensions without departing from the scope of the inventive concept.

Figure 3F:
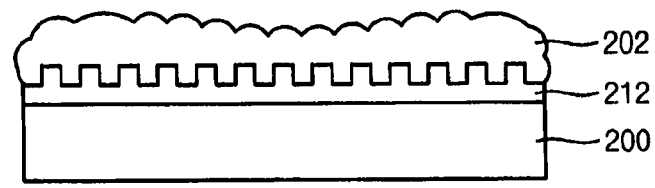

Referring to FIG. 3F, a metal ink 202 is disposed on the transferred pattern 212. The metal ink 202 may include metal paste including metal wires and/or nano-sized conductive metal particles. The metal wires and/or the metal particles may include at least of aluminum (Al), gold (Au), silver (Ag), copper (Cu), chrome (Cr), iron (Fe), and nickel (Ni).

The metal ink 202 may be a mixing agent including the metal wires and water. An amount of the metal wires in the metal ink may be about 10 weight % based on a total weight of the metal ink, and an amount of water in the metal ink may be about 90 weight % based on the total weight of the metal ink.

The metal ink 202 may be sprayed by a dispensing process, a screen printing process, a spin coating process, a slit coating process, a bar coating process or a nozzle spraying process, but is not limited thereto.

Figure 3G:
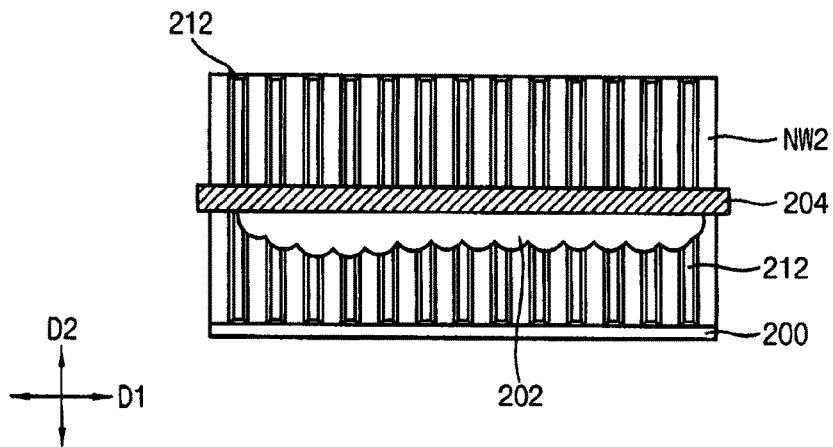

Referring to FIG. 3G, a squeegee 204 is disposed on the metal ink 104. The squeegee 104 is moved on the transferred pattern 212 in the second direction D2, which is substantially perpendicular to the first direction D1, and the metal ink 202 is entirely spread on the transferred pattern 212 to the second direction D2 on which the transferred pattern 212 extends. During this operation, metal wires of the metal ink 202 are arranged in the recesses of the transferred pattern 212. A portion of the metal ink disposed outside the recesses of the transferred pattern are removed by moving the squeegee 204. The squeegee 204 may include rubber materials.

The metal ink 202 which is disposed in the recesses of the transferred pattern 212 may be heated. The water which is used as a solvent in the metal ink 202 is evaporated. Thus, a polarizer PL2 is formed. The polarizer PL2 includes a plurality of the nano wires NW2 disposed in the recesses of the transferred pattern 212.

In an exemplary embodiment, the nano wires NW2 disposed in the recesses of the transferred pattern 212 may have a gap between two adjacent nano wires NW2, and may be a polarizer including a wire grid pattern. For example, a pitch of the nano wires NW2 may be controlled by a gap between two adjacent recesses of transferred patterns 212.

Figure 3H:
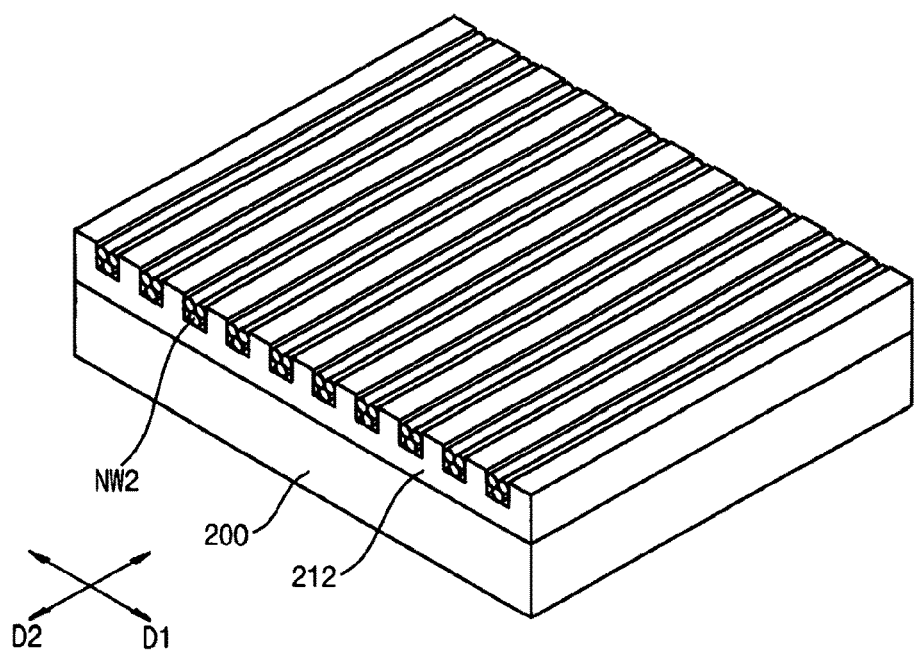
FIG. 3H is a perspective view illustrating a polarizer in accordance with an exemplary embodiment of the inventive concept.

FIG. 3H is a perspective view illustrating a polarizer in accordance with an exemplary embodiment of the inventive concept.

Referring to FIG. 3H, the polarizer PL2 includes the substrate 200, the transferred pattern 212 and the nano wires NW2. The transferred pattern 212 is disposed on the substrate 200. The nano wires NW2 are disposed in the recesses of the transferred pattern 212. For example, at least two nano wires NW2 may be disposed in a single recess of the transferred pattern 212.

The nano wires NW2 have a cylindrical shape and are arranged in a first direction D1. The nano wires NW2 may include multi-layered structure. A diameter D of each of the nano wires NW2 may be about 10 nm to about 50 nm. For example, the diameter D of each of the nano wires NW2 may be about 20 nm to about 30 nm. However these dimensions are merely exemplary.

The nano wires NW2 may include metal. For example, the nano wires NW2 may include at least one of aluminum (Al), gold (Au), silver (Ag), copper (Cu), chrome (Cr), iron (Fe), and nickel (Ni).

FIGS. 4A to 4E are cross-sectional views for describing a method of manufacturing a polarizer in accordance with an exemplary embodiment of the inventive concept. FIG. 4F is a perspective view illustrating a polarizer in accordance with an exemplary embodiment of the inventive concept.

Figure 4A:
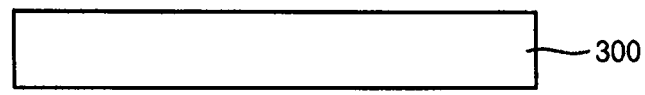
FIGS. 4A, 4B, 4C, 4D, and 4E are cross-sectional views illustrating a method of manufacturing a polarizer in accordance with an example embodiment of the inventive concept.

Referring to FIG. 4A, a substrate 300 is provided. For example, the substrate 300 may include a glass substrate, a transparent plastic substrate, a transparent ceramic substrate, etc. The substrate 300 may be a flexible substrate. The transparent plastic substrate/transparent ceramic substrate may include polyimide type resin, acrylic type resin, polyacrylate type resin, polycarbonate type resin, polyether type resin, polyethylene terephthalate type resin, sulfonic acid type resin, etc.

Figure 4B:
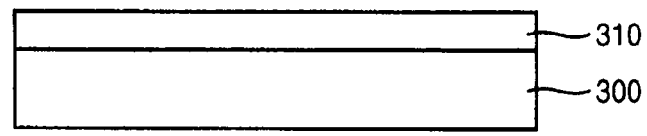

Referring to FIG. 4B, a metal layer 310 is formed on the substrate 300. The metal layer 310 may include at least one of aluminum (Al), gold (Au), silver (Ag), copper (Cu), chrome (Cr), iron (Fe), and nickel (Ni). The metal layer 310 may be formed by a deposition process, but is not limited thereto. For example, the metal layer 310 may be formed by a chemical vapor deposition process.

Figure 4C:
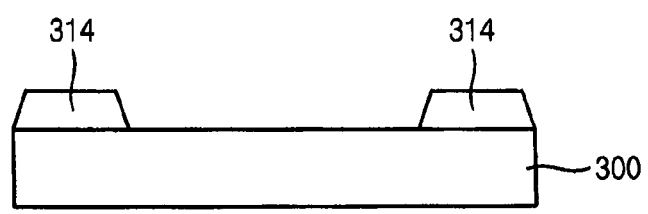

Referring to FIG. 4C, the metal layer 310 is patterned to form reflection patterns 314. The reflection patterns 314 may have planar upper surfaces. The reflection patterns 314 may be formed in a light blocking area of a display panel in which a black matrix is formed.

Figure 4D:
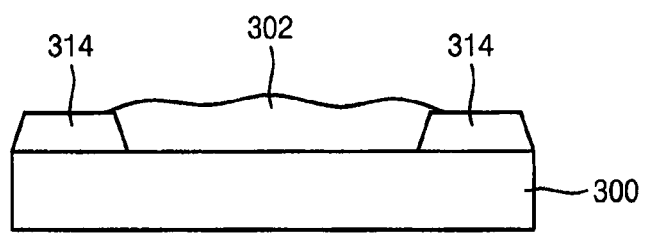

Referring to FIG. 4D, a metal ink 302 is sprayed on the reflection patterns 314 and the substrate 300; however, other methods of deposition are possible. The metal ink 302 is disposed between two adjacent reflection patterns 314. The metal ink 302 may include metal paste including metal wires and/or nano-sized conductive metal particles. The metal wires and the metal particles may include at least one of aluminum (Al), gold (Au), silver (Ag), copper (Cu), chrome (Cr), iron (Fe), and nickel (Ni).

The metal ink 302 may be a mixing agent including the metal wires and water. An amount of the metal wires in the metal ink may be about 10 weight % based on a total weight of the metal ink, and an amount of water in the metal ink may be about 90 weight % based on the total weight of the metal ink.

The metal ink 302 may be sprayed by a dispensing process, a screen printing process, a spin coating process, a slit coating process, a bar coating process or a nozzle spraying process, but is not limited thereto.

Figure 4E:
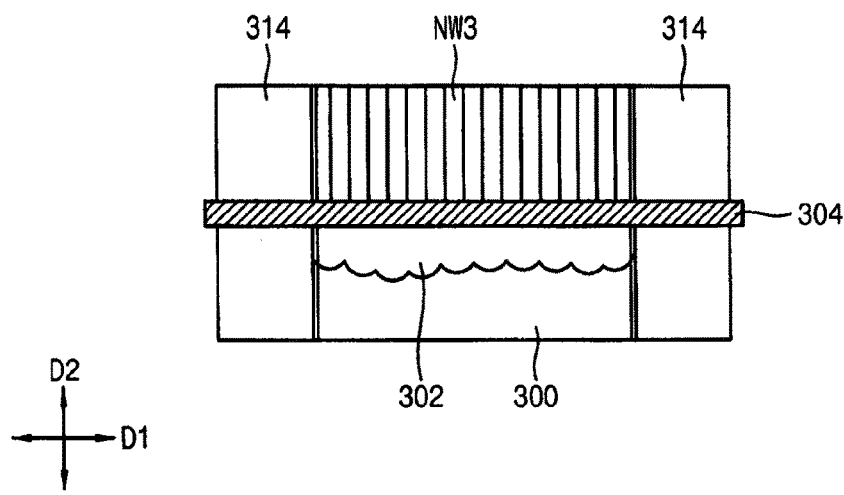
Figure 4F:
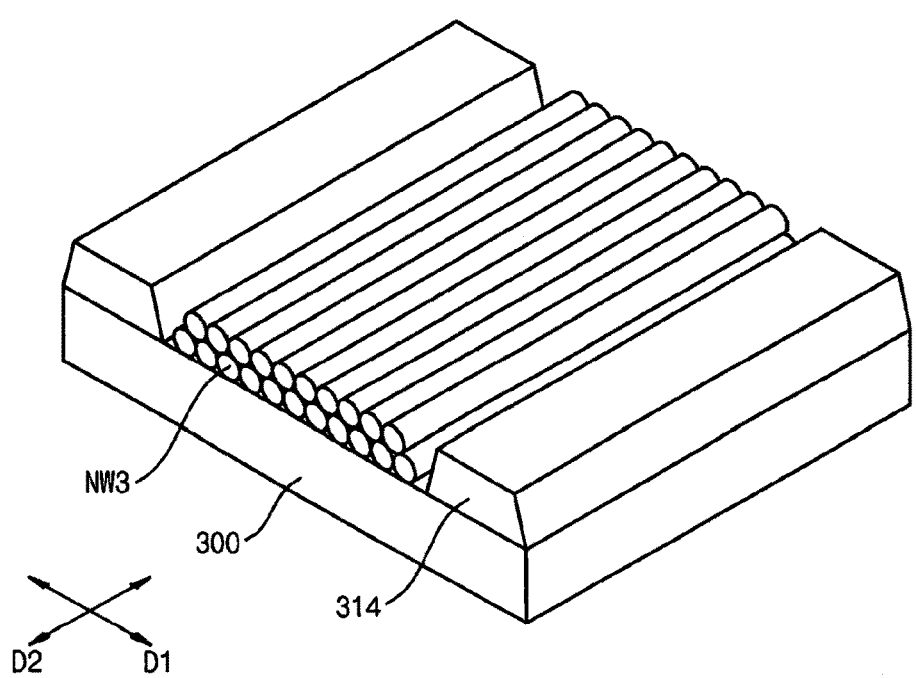
FIG. 4F is a perspective view illustrating a polarizer in accordance with an exemplary embodiment of the inventive concept.

Referring to FIG. 4E, a squeegee 304 is disposed on the metal ink 302. The squeegee 304 is moved on the substrate 300 in the second direction D2 which is substantially perpendicular to the first direction D1, and the metal ink 302 is entirely spread between the reflection patterns 314 in the second direction D2. During this operation, the metal wires of the metal ink 302 are arranged between the reflection patterns 314. The squeegee 304 may include rubber materials.

The metal ink 302, which is disposed between the reflection patterns 314, is heated. The water which is used as a solvent in the metal ink 302 is evaporated. Thus, a polarizer PL3 is formed. The polarizer PL3 includes nano wires NW3, which may include metal wires, disposed between the reflection patterns 314.

Referring to FIG. 4F, the polarizer PL3 includes the substrate 300, the reflection patterns 314 and the plurality of the nano wires NW3. The reflection patterns 314 and the plurality of the nano wires NW3 are formed on a same layer.

Each of the nano wires NW3 has a cylindrical shape and the nano wires NW3 are arranged in a first direction D1. The nano wires NW3 may include a multi-layered structure. A diameter D of each of the nano wires NW3 may be about 10 nm to about 50 nm. For example, the diameter D of each of the nano wires NW3 may be about 20 nm to about 30 nm. However these dimensions are merely exemplary and other dimensions are possible.

The nano wires NW3 may include metal. For example, the nano wires NW3 may include at least one of aluminum (Al), gold (Au), silver (Ag), copper (Cu), chrome (Cr), iron (Fe), and nickel (Ni).

Figure 5:
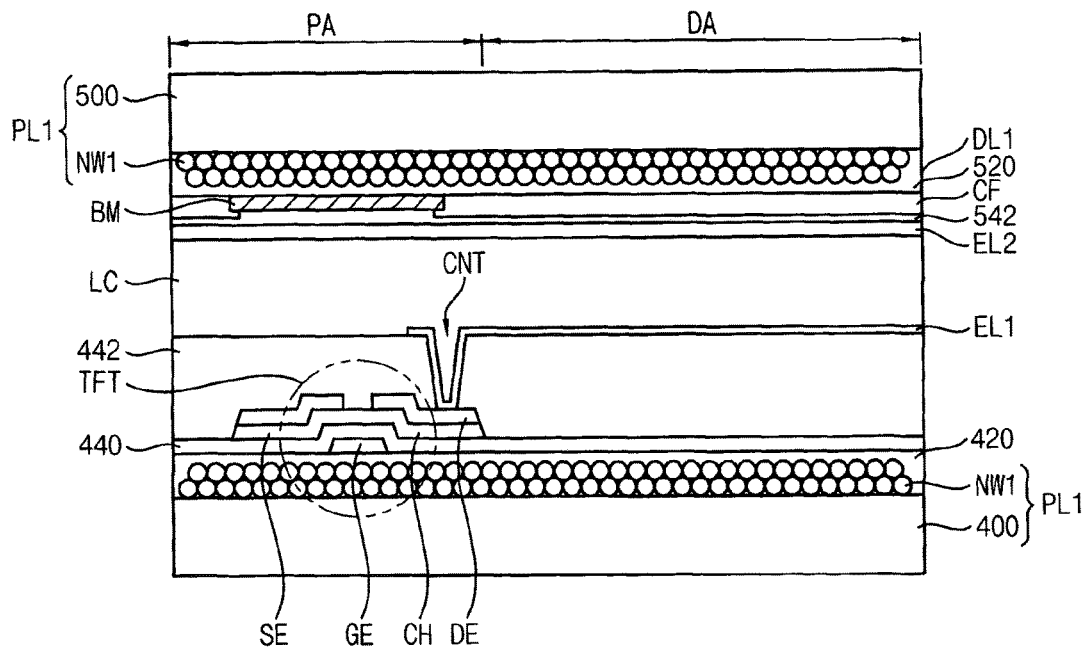
FIG. 5 is a cross-sectional view illustrating a display panel in accordance with an exemplary embodiment of the inventive concept.

FIG. 5 is a cross-sectional view illustrating a display panel in accordance with an exemplary embodiment of the inventive concept.

The display panel includes an array substrate, an opposing substrate, and a liquid crystal layer LC disposed between the array substrate and the opposing substrate. The display panel includes a transmittance area DA and a light blocking area PA. The transmittance area DA is an area in which light is transmitted from a backlight unit (not shown). The light blocking area PA is an area in which the light from the backlight unit is blocked.

The array substrate includes a first substrate 400, a polarizer PL1, a first insulating layer 420, a gate insulating layer 440, a thin film transistor TFT, a protecting layer 442, and a first electrode EL1. The polarizer PL1 includes the first substrate 400 and a plurality of nano wires NW1.

The first substrate 400 may include a transparent material. For example, the first substrate 400 may include a glass substrate, a transparent plastic substrate, a transparent ceramic substrate, etc. The first substrate 400 may be a flexible substrate. The transparent plastic substrate/transparent ceramic substrate may include polyimide type resin, acrylic type resin, polyacrylate type resin, polycarbonate type resin, polyether type resin, polyethylene terephthalate type resin, sulfonic acid type resin, etc.

The plurality of nano wires NW1 is disposed on the first substrate 400. The polarizer PL1 includes the plurality of the nano wires NW1.

The polarizer PL1 shown in FIG. 5 is substantially the same as the polarizer PL1 in FIG. 1. Thus, any further detailed descriptions concerning the same elements will be omitted.

The first insulating layer 420 is disposed on the nano wires NW1. The first insulating layer 420 may include inorganic material such as silicon oxide (SiOx) and silicon nitride (SiNx), but is not limited thereto.

A gate electrode GE and a gate line (not shown) are disposed on the first insulating layer 420.

The gate insulating layer 440 is disposed on the first insulating layer 420 on which the gate electrode GE and the gate line are disposed. The gate insulating layer 440 may include inorganic material such as silicon oxide (SiOx) and silicon nitride (SiNx), but is not limited thereto.

A channel layer CH overlapping the gate electrode GE is disposed on the gate insulating layer 440.

The channel layer CH may include a semiconductor layer including amorphous silicon (a-Si:H), and an ohmic contact layer including n+ amorphous silicon (n+ a-Si:H). The channel layer CH may include an oxide semiconductor. The oxide semiconductor may include an amorphous oxide including one of indium (In), zinc (Zn), gallium (Ga), tin (Sn) and hafnium (Hf), and a combination thereof. More particularly, the oxide semiconductor may include an amorphous oxide including indium (In), zinc (Zn), and gallium (Ga), or an amorphous oxide including indium (In), zinc (Zn), and hafnium (Hf). The oxide semiconductor may include an oxide such as indium zinc oxide ("InZnO"), indium gallium oxide ("InGaO"), indium tin oxide ("InSnO"), zinc tin oxide ("ZnSnO"), gallium tin oxide ("GaSnO"), and gallium zinc oxide ("GaZnO").

A source electrode SE and a drain electrode DE are disposed on the channel layer CH. The source electrode SE may be connected to a data line (not shown). The display panel may include source electrodes SE, drain electrodes DE and data lines. The drain electrode DE is electrically connected the first electrode EL1 through a contact hole CNT.

The gate electrode GE, the source electrode SE, the drain electrode DE and the channel layer CH form the thin film transistor TFT.

The protecting layer 442 is disposed on the thin film transistor TFT. The protecting layer 442 may include an inorganic material such as silicon oxide (SiOx) and silicon nitride (SiNx). The protecting layer 442 may include organic insulating material having relatively low permittivity. The protecting layer 442 may have a single layer structure, or a double layer structure of inorganic and/or organic insulating layers. The protecting layer 442 includes the contact hole CNT exposing a portion of the drain electrode DE.

The opposing substrate includes a second substrate 500, a polarizer PL1, a second insulating layer 520, a black matrix BM, a color filter CF, an over-coating layer 542, and a second electrode EL2. The polarizer PL1 includes the second substrate 500 and a plurality of the nano wires NW1.

The second substrate 500 is opposite to the first substrate 400.

The plurality of the nano wires NW1 is disposed on the second substrate 500. The polarizer PL1 is substantially the same as the polarizer PL1 in FIG. 1. Thus, any further detailed descriptions concerning the same elements will be omitted.

The second insulating layer 520 is disposed on the second substrate 500 on which the polarizer PL1 is disposed. The second insulating layer 520 may include inorganic material such as silicon oxide (SiOx) and silicon nitride (SiNx), but is not limited thereto or thereby.

The black matrix BM is disposed on the second insulating layer 520. The black matrix BM corresponds to the light blocking area PA, and blocks light. Thus, in one exemplary embodiment, the black matrix BM overlaps the data line, the gate line and the thin film transistor TFT.

The black matrix BM may include, for example, a dark color or black material such as inorganic black material, organic black material, etc. For example, the black material may include a coloring agent, such as carbon black, an organic material or inorganic material, color pigment or the like to represent black. The black matrix BM may include organic black material such as acryl resin or binder resin.

The color filter CF is disposed on the black matrix BM and the second insulating layer 520. The color filter CF colors the light passing through the liquid crystal layer LC. The color filter CF may include a red color filter, a green color filter and a blue color filter, but is not limited thereto. The color filter CF may be disposed corresponding to a pixel area. The display panel may include a plurality of color filters. Color filters adjacent to each other may have different colors from each other, but are not limited thereto or thereby. A color filter CF may overlap an adjacent color filter CF in a boundary of the pixel area. However, the color filter CF may be spaced apart from an adjacent color filter CF in the boundary of the pixel area.

The over-coating layer 542 is disposed on the black matrix BM. The over-coating layer 542 provides a substantially planar surface and flattens the stepped profile of the color filter CF, protects the color filter CF, and insulates the color filter CF. The over-coating layer 542 may include acrylic-epoxy material, but is not limited thereto or thereby.

The second electrode EL2 is disposed in an area corresponding to the pixel area. The second electrode EL2 is electrically connected to a common voltage line (not shown). The second electrode EL2 may have a slit pattern which may include a plurality of openings. The second electrode EL2 may include a transparent conductive material, such as indium tin oxide ("ITO"), indium zinc oxide ("IZO"), etc.

The liquid crystal layer LC is disposed between the array substrate and the opposite substrate. The liquid crystal layer LC may include liquid crystal molecules having optical anisotropy. The liquid crystal molecules may be driven by an electric field, such as an electric field generated by voltages applied to the first and second electrodes EL1 and EL2, so that an image is displayed by the passing-through or the blocking of light through the liquid crystal layer LC.

Figure 6:
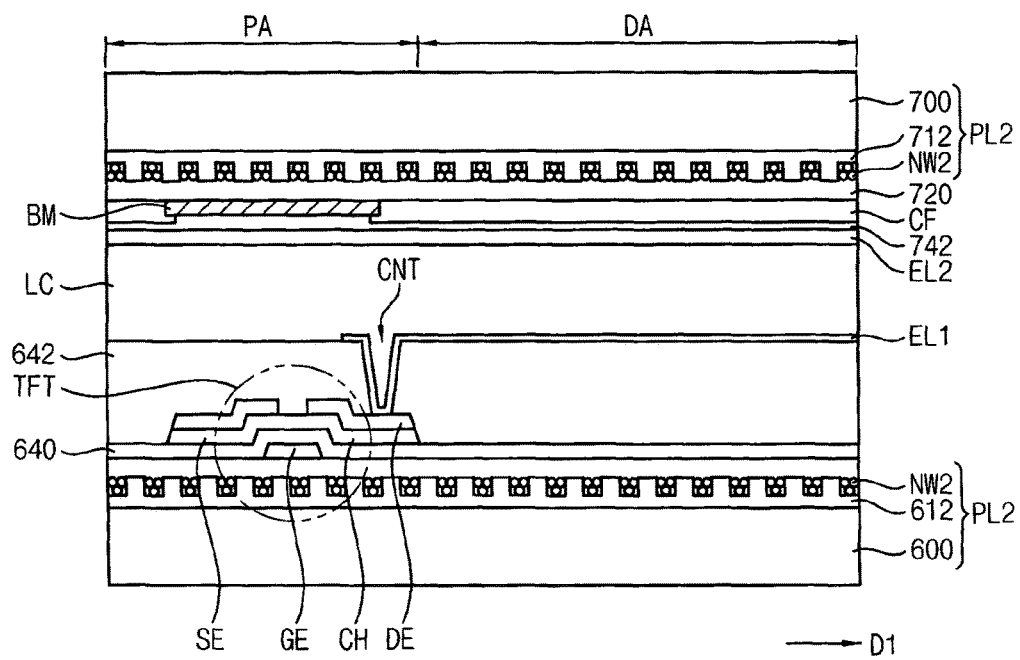
FIG. 6 is a cross-sectional view illustrating a display panel in accordance with an exemplary embodiment of the inventive concept.

FIG. 6 is a cross-sectional view illustrating a display panel in accordance with an exemplary embodiment of the inventive concept.

Referring to FIG. 6, the display panel without a polarizer is substantially the same as the display panel in FIG. 5. Thus, any further detailed descriptions concerning the same elements will be omitted.

The display panel includes a polarizer PL2 which is disposed on each of a first substrate 600 and a second substrate 700.

The polarizer PL2 includes the first substrate 600, a transferred pattern 612, and a plurality of nano wires NW2.

The transferred pattern 612 is disposed on the first substrate 600. The nano wires NW2 are disposed in recesses of the transferred patterns 612.

The polarizer PL2 includes the second substrate 700, a transferred pattern 712, and a plurality of nano wires NW2. The transferred pattern 712 is disposed on the second substrate 700. The nano wires NW2 are disposed in recesses of the transferred patterns 712.

The transferred patterns 612 and 712 each include a plurality of protrusions and recesses. The transferred patterns 612 and 712 may include thermosetting resin or photo curable resin, but is not limited thereto. For example, the thermosetting resin may include urea resin, melamine resin, phenol resin, etc. The photo curable resin may include polymerizable compounds having a polymerizable functional group, a photo polymerization initiator initiating polymerization of the polymerizable compounds by irradiation, surfactants, antioxidants, etc.

Each of the nano wires NW2 has a cylindrical shape and the nano wires NW2 are arranged in a first direction D1. The nano wires NW2 may include a multi-layered structure. A diameter D of each of the nano wires NW2 may be about 10 nm to about 50 nm. For example, the diameter D of each of the nano wires NW2 may be about 20 nm to about 30 nm. However, these dimensions are merely exemplary and other dimensions are possible.

The nano wires NW2 may include metal. For example, the nano wires NW2 may include at least one of aluminum (Al), gold (Au), silver (Ag), copper (Cu), chrome (Cr), iron (Fe), and nickel (Ni).

In an exemplary embodiment, the nano wires NW2 disposed in the recesses of the transferred patterns 612 and 712 may have a gap between adjacent recesses, and may serve as a polarizer including a wire grid pattern. For example, a pitch of the nano wires NW2 may be controlled by a gap between the adjacent recesses of transferred patterns 612 and 712.

Figure 7:
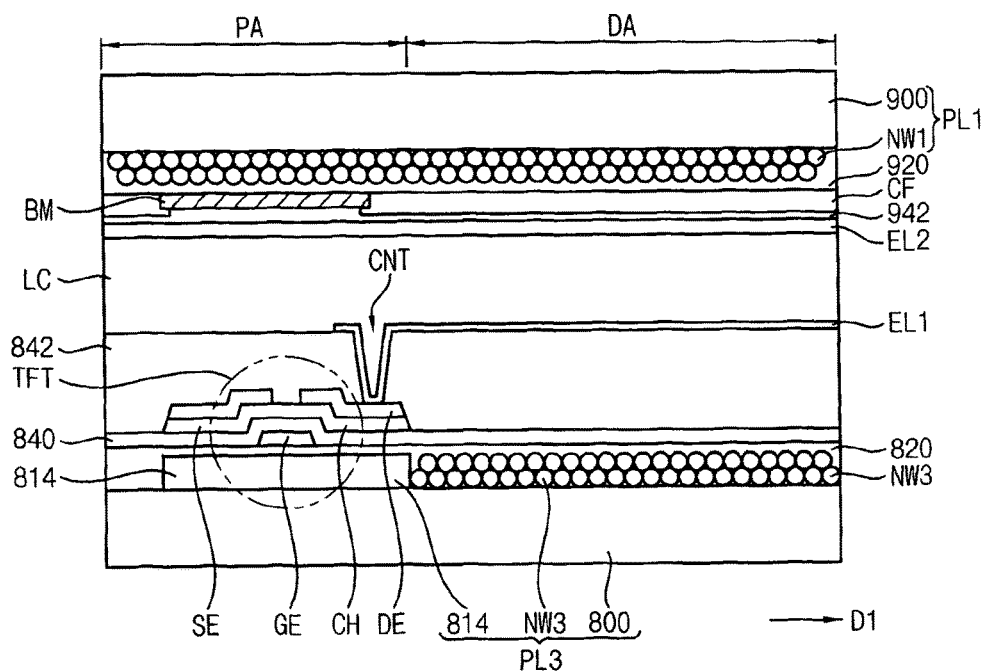
FIG. 7 is a cross-sectional view illustrating a display panel in accordance with an exemplary embodiment of the inventive concept.

FIG. 7 is a cross-sectional view illustrating a display panel in accordance with an exemplary embodiment of the inventive concept.

Referring to FIG. 7, the display panel except the polarizer arrangement is substantially the same as the display panel in FIG. 5, respectively. Thus, any further detailed descriptions concerning the same elements will be omitted.

The display panel includes an array substrate, an opposing substrate and a liquid crystal layer LC disposed between the array substrate and the opposing substrate. The display panel includes a transmittance area DA and a light blocking area PA. The transmittance area DA is an area in which light is transmitted from backlight unit. The light blocking area PA is an area in which the light from the backlight unit is blocked.

The display panel includes a polarizer PL3 and a polarizer PL1. The polarizer PL1 includes a second substrate 900 and nano wires NW1. The plurality of the nano wires NW1 is disposed on the second substrate. The polarizer PL3 includes a first substrate 800, a reflection pattern 814 and nano wires NW3. The reflection pattern 814 and the nano wires NW3 are disposed on the first substrate 800.

The polarizer PL1 is substantially the same as the polarizer PL1 in FIG. 1. Thus, any further detailed descriptions concerning the same elements will be omitted.

The reflection pattern 814 is disposed on the first substrate 800. The nano wires NW3 and the reflection pattern 814 may be disposed on a same layer.

The reflection pattern 814 is disposed in an area corresponding to the light blocking area PA, and blocks light from backlight unit. The reflection pattern 814 overlaps the thin film transistor TFT. The reflection pattern 814 may include multi-layered structure.

The reflection pattern 814 may include metal. For example, the reflection pattern 814 may include at least one of aluminum (Al), gold (Au), silver (Ag), copper (Cu), chrome (Cr), iron (Fe), and nickel (Ni).

Each of the nano wires NW3 has a cylindrical shape and the nano wires NW3 are arranged in a first direction D1. The nano wires NW3 are disposed in an area corresponding to the transmittance area DA. The nano wires NW1 may include a multi-layered structure. A diameter of each of the nano wires NW3 may be about 10 nm to about 50 nm. For example, the diameter of each of the nano wires NW3 may be about 20 nm to about 30 nm. However these dimensions are merely exemplary and may vary.

The nano wires NW3 may include metal. For example, the nano wires NW3 may include at least one of aluminum (Al), gold (Au), silver (Ag), copper (Cu), chrome (Cr), iron (Fe), and nickel (Ni).

A black matrix BM is disposed in an area corresponding to the light blocking area PA, and is disposed on a second insulating layer 920. The black matrix BM overlaps the reflection pattern 814.

Figure 8:
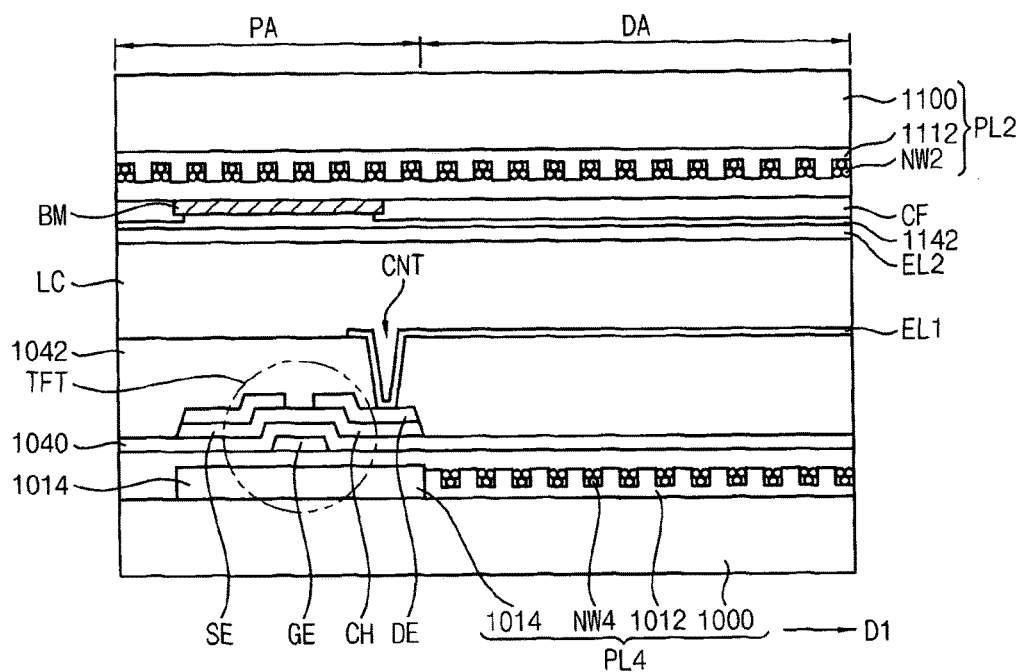
FIG. 8 is a cross-sectional view illustrating a display panel in accordance with an exemplary embodiment of the inventive concept.

FIG. 8 is a cross-sectional view illustrating a display panel in accordance with an exemplary embodiment of the inventive concept.

Referring to FIG. 8, the display panel except the polarizer is substantially the same as the display panel in FIG. 5. Thus, any further detailed descriptions concerning the same elements will be omitted.

The display panel includes an array substrate, an opposing substrate and a liquid crystal layer LC disposed between the array substrate and the opposing substrate. The display panel includes a transmittance area DA and a light blocking area PA. The transmittance area DA is an area in which light is transmitted from backlight unit. The light blocking area PA is an area in which the light is blocked.

The display panel includes a polarizer PL4 and a polarizer PL2. The polarizer PL2 includes a second substrate 1100, a plurality of nano wires NW2 and a transferred pattern 1112. The nano wires NW2 is disposed in recesses of the transferred pattern 1112. The polarizer PL4 includes a first substrate 1000, a reflection pattern 1014, a transferred pattern 1012 and a plurality of nano wires NW4.

The nano wires NW2 and the transferred pattern 1112 are disposed on the second substrate 1100. The polarizer PL2 is substantially the same as the polarizer PL2 in FIG. 3. Thus, any further detailed descriptions concerning the same elements will be omitted.

The reflection pattern 1014, the transferred pattern 1012 and the nano wires NW4 are disposed on the first substrate 1000. The reflection pattern 1014, the transferred pattern 1012, and the plurality of nano wires NW4 may be disposed on a same layer.

The reflection pattern 1014 is disposed in an area corresponding to the light blocking area PA. The reflection pattern 1014 may have a flat upper surface and may block light from the backlight unit. The reflection pattern 1014 overlaps the thin film transistor TFT. The reflection pattern 1014 may include multi-layered structure.

The reflection pattern 1014 may include metal. For example, the reflection pattern 1014 may include at least one of aluminum (Al), gold (Au), silver (Ag), copper (Cu), chrome (Cr), iron (Fe), and nickel (Ni).

The transferred pattern 1012 and the plurality of the nano wires NW4 are disposed in an area corresponding to the transmittance area DA.

The transferred pattern 1012 includes a plurality of protrusions and a plurality of recesses. The transferred pattern 1012 may include thermosetting resin or photo curable resin. For example, a height of each of the protrusions or the recesses of the transferred pattern 1012 may be about 100 nm to about 200 nm. A width of each of the recesses may be about 40 nm to about 70 nm. However, these dimensions are merely exemplary and other dimensions are possible.

The transferred patterns 1012 may include thermosetting resin or photo curable resin, but are not limited thereto. For example, the thermosetting resin may include urea resin, melamine resin, phenol resin, etc. The photo curable resin may include polymerizable compounds having a polymerizable functional group, a photo polymerization initiator initiating polymerization of the polymerizable compounds by irradiation, surfactants, antioxidants, etc.

The nano wires NW4 are disposed in each of the recesses of the transferred pattern 1012. Each of the nano wires NW4 may have a cylindrical shape and the nano wires NW 4 are arranged in a first direction D1. The nano wires NW4 may include multi-layered structure. A diameter of each of the nano wires NW4 may be about 10 nm to about 50 nm. For example, the diameter D of each of the nano wires NW4 may be about 20 nm to about 30 nm. However, these dimensions are merely exemplary, and other dimensions are possible.

The nano wires NW4 may include metal. For example, the nano wires NW4 may include at least one of aluminum (Al), gold (Au), silver (Ag), copper (Cu), chrome (Cr), iron (Fe), and nickel (Ni).

In an exemplary embodiment, the nano wires NW4 disposed in the recesses of the transferred pattern 1012 may have a gap between the adjacent nano wires NW4, and may serve as a polarizer including a wire grid pattern. For example, a pitch of the nano wires NW4 may be controlled by a gap between the recesses in the adjacent transferred patterns 1012.

A black matrix BM is disposed in an area corresponding to the light blocking area PA, and is disposed on a second insulating layer 1120. The black matrix BM overlaps the reflection pattern 1014.

According to exemplary embodiments of the inventive concept, since a polarizer is formed from an ink including a plurality of metal wires, additional processes such as nanoimprint process or dry-etching processes may be avoided. Thus, additional cost of manufacturing may be decreased.

According to exemplary embodiments of the inventive concept, since a polarizer including metal wire patterns and a reflecting pattern are disposed on a same layer as where the metal wire patterns may be formed, a thickness of a display panel may be decreased.

According to exemplary embodiments of the inventive concept, the polarizer includes a reflecting pattern having a width which is greater than a width of each of the metal wire patterns, and may partially reflect to incident light.

According to exemplary embodiments of the inventive concept, the polarizer includes metal wires which form nano-size patterns, and a crack of a flexible display panel may be prevented.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display panel, comprising:
   a first substrate;
   a second substrate disposed opposite the first substrate; and
   a liquid crystal layer disposed between the first substrate and the second substrate,
   wherein the first substrate comprises:
      a first wire grid pattern disposed on the first substrate and extending in a first direction, the first wire grid pattern comprising first recesses spaced apart from each other; and
      a plurality of first metal wires disposed in the first recesses.

2. The display panel of claim 1, wherein a diameter of each of the first metal wires is between 10 nm and 50 nm.

3. The display panel of claim 1, wherein a height of each of the first recesses is between 100 nm and 200 nm.

4. The display panel of claim 1, wherein a width of each of the first recesses is between 40 nm and 70 nm.

5. The display panel of claim 1, wherein the first metal wires comprise at least one metal selected from the group consisting of aluminum (Al), gold (Au), silver (Ag), copper (Cu), chrome (Cr), iron (Fe), and nickel (Ni).

6. The display panel of claim 1, wherein the first wire grid pattern comprises a photo curable resin or a thermosetting resin.

7. The display panel of claim 1, further comprising:
   a reflection pattern having a width greater than a width of each of the first recesses,
   wherein the reflection pattern and the first wire grid pattern are disposed on a same layer.

8. The display panel of claim 7, wherein the reflection pattern comprises at least one metal selected from the group consisting of aluminum (Al), gold (Au), silver (Ag), copper (Cu), chrome (Cr), iron (Fe), and nickel (Ni).

9. The display panel of claim 1, wherein the first substrate further comprises a thin film transistor.

10. The display panel of claim 1, wherein the second substrate further comprises a color filter.

11. The display panel of claim 1, further comprising:
   a polarizer disposed on the second substrate, the polarizer comprising a second wire grid pattern and second metal wires, the second wire grid pattern being disposed on the second substrate and extending in the first direction, the second wire grid pattern comprising a second recesses spaced apart from each other, and the second metal wires being disposed in the second recesses.

12. A method of manufacturing a polarizer, the method comprising:
   forming a polymer layer on a substrate;
   applying pressure on the polymer layer based on a mold to form a transferred pattern, the transferred pattern comprising a plurality of recesses extending in a first direction;
   disposing an ink comprising metal wires on the transferred pattern;
   moving a squeegee in a first direction on the transferred pattern to remove a portion of the ink disposed outside the recesses of the transferred pattern; and
   heating the ink to form a metal wire pattern.

13. The method of claim 12, the metal wires comprise at least one metal selected from the group consisting of aluminum (Al), gold (Au), silver (Ag), copper (Cu), chrome (Cr), iron (Fe) and nickel (Ni).

14. The method of claim 12, wherein an amount of the metal wires in the ink is 10 weight % based on a total weight of the ink, and an amount of water in the ink is 90 weight % based on the total weight of the ink.

15. The method of claim 12, further comprising:
curing the polymer layer by heat or light.

16. A method of manufacturing a polarizer, the method comprising:
forming a metal layer on a substrate;
patterning the metal layer to form reflective patterns;
disposing an ink comprising metal wires on the substrate between two adjacent reflection patterns by moving a squeegee;
heating the ink to form a metal wire pattern.

17. The method of claim 16, wherein an amount of the metal wires in the ink is 10 weight % based on a total weight of the ink, and an amount of water in the ink is 90 weight % based on the total weight of the ink.

18. The method of claim 16, wherein the reflection pattern and the metal wire pattern are disposed on a same layer.

* * * * *